Sept. 11, 1962 A. H. PLACH ET AL 3,053,723
ARTICLE FABRICATING APPARATUS AND METHOD
Filed May 29, 1958 3 Sheets-Sheet 1
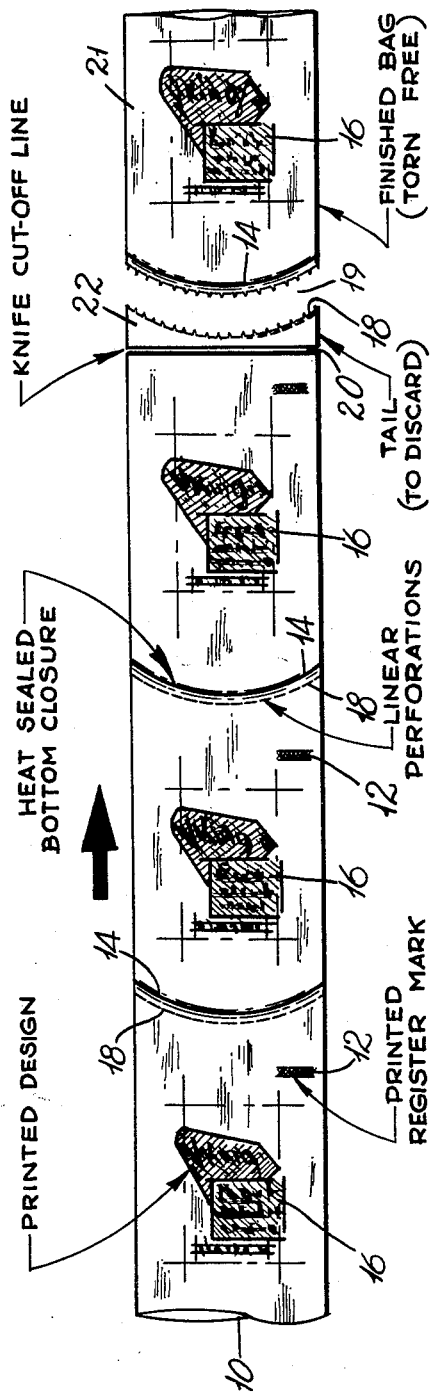
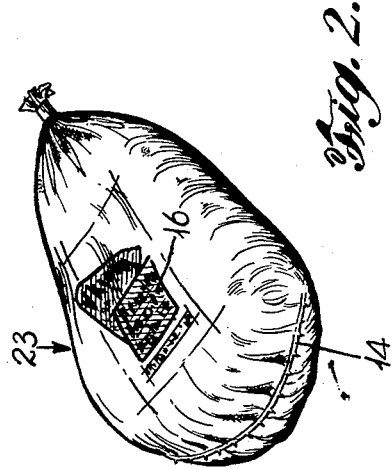
Fig. 2.
Fig. 1.
INVENTORS
ALVIN H. PLACH
ALVIN E. ERICSON
BY
Barnwell R. King
ATTORNEY INVENTORS
ALVIN H. PLACH
ALVIN E. ERICSON
BY
Barnwell R. King
ATTORNEY

INVENTORS
ALVIN H. PLACH
ALVIN E. ERICSON

United States Patent Office 3,053,723
Patented Sept. 11, 1962

3,053,723
ARTICLE FABRICATING APPARATUS
AND METHOD
Alvin H. Plach and Alvin E. Ericson, Chicago, Ill., assignors to Union Carbide Corporation, a corporation of New York
Filed May 29, 1958, Ser. No. 738,862
16 Claims. (Cl. 156—252)

This invention relates to the fabrication of articles from flattened tubular film, and more particularly to a novel process and machine for automatically determining successive reference positions in continuous tubular thermoplastic film, to index, seal and separate the film, and cut off surplus film from each article.

Plastic bags for packaging a wide variety of items are produced in large quantities, using sheeting or tubing of polyethylene, vinyl or other heat-sealable thermoplastic composition of film. They commonly formed into plain and gusseted bags, ranging in size from 3" wide by 3" long to 48" wide by 60" long, and in wall thicknesses from .001" to .006". Such bags may be made from plain or imprinted tubular film stock. The seam or seal comprising the bottom of the bag may be made straight (transverse to the web direction), or may be made curved, in a variety of contours desirable for the end product involved.

Vinyl film such as polyvinyl chloride and polyethylene film, are used to make bags or pouches for tightly wrapping and packaging a variety of meat items which require a curved-seal bottom to the pouch and a straight-open top. Such elastic pouches are filled by initially sheathing the open end of the empty pouch onto a plurality of adjacently positioned curved metal fingers. The fingers are then caused to separate, transversely stretching the pouch a distance sufficient to deposit the meat item therein. The meat item is inserted into the distended pouch, pushed snugly to the pouch bottom, and unsheathed as the fingers are released. The open end of the pouch is then stretched, as by pulling firmly around the meat item, and gathered together or folded for sealing by heat or mechanical means. Subsequently, the elastic pouch tends to shrink to its original state thus tightly enveloping the meat item therein. For the desired tight packaging, a pouch size is preselected for a particular class of meat item which has a relaxed periphery less than the periphery of the meat item, according to the application of E. O. Johnson, Serial No. 456,376, filed September 16, 1954, now Patent No. 2,884,328, dated April 28, 1959.

The method and apparatus of the invention, hereafter described, may also be practiced in fabricating thermoplastic pouches made of materials such as heat-shrinkable polyethylene and polyvinylidene chloride films. Such pouches, usually made with a curved-seal bottom are used in shrink-packaging operations by loosely enveloping a meat item therein, then firmly gathering, as by pleating the open end, evacuating the air from within the pouch, sealing as by heat or mechanical means, then immersing the pouch item completely in a fluid maintained at a temperature which shrinks the film tightly around the meat item, causing it to conform to the contours thereof.

Optimum performance and appearance of pouches for tightly wrapping meat items has demanded: (1) A curved-seal bottom pouch, shaped to conform generally to the contour of the meat item, and having a uniformly strong seal to accommodate the strains of product insertion and film distention. (2) A minimal length of unsealed film extending outwardly from the sealed bottom portion of the pouch. (3) The open top of the pouch to be shaped straight and square. (4) Any imprinted design or trademark on the pouch to be uniformly indexed with the pouch length.

The films used for the stretch-packaging operations are characterized by being limp and elastic (with a time-extended elastic memory). The vinyl type has a narrow heat-sealing temperature range. Such films supplied on reels for the bag-making operation, are usually under considerable strain and tension from prior manufacturing operations. Such tension varies considerably throughout a reel of film. Changes in length of 5–10% have been found between the tensioned and relaxed condition of the film. Film must be in a relaxed state prior to and immediately after heat-sealing, because a web under tension during that interval weakens and sometimes severs the bottom seal.

An object of the invention is to provide a method of and machine for automatically producing pouches with the foregoing characteristics. This is accomplished by measuring a unit length of flattened tubular film and making a curved heat-seal therein while such film is relaxed and under no tension. Such film then is intermittently transported through succeeding operations to a cutoff point. Such heat-seal is registered automatically with the cutoff point and the web is severed close to the curved heat-seal, and a straight cut is made on the adjacent end of the succeeding bag, and the "tail" therebetween is discarded.

More particularly, according to the invention, there is provided a process of making bags out of flattened tubing such as a continuous web of stretchy film, which comprises feeding such flattened tubing to a first station; relaxing a portion of the length of such flattened tubing at said station; and sealing said flattened tubing to provide the bottom closure of each bag to be made at said station. Such sealing step is accompanied simultaneously by the step of perforating said flattened tubing adjacent such seal outside of the bottom closure to provide a weakened transverse structure for subsequently separating adjacent parts of such web and also to provide an opening for an electrical discharge between electrodes located at a second station. The web then moves to such second station where an electric current is discharged through said opening in response to which each bag portion of said flattened tubing is pulled away from the rest of said continuous web to separate such bag portion along such weakened structure; and additionally the web is severed along a line extending transversely across said web to remove waste left between the edge of the end of said film and the unsealed top of the next bag portion of said web.

Further, according to the invention, there is provided an automatic bag-making machine comprising, in combination, first and second stations provided with means for sealing and perforating a continuous web of stretchable film in the form of flattened tubing at said first station, and means for separating bags and cutting waste from such web at said second station. Novel means are associated with said feeding means for delivering said film to said first station in a relaxed condition, so that maximum strength seals are provided in the web as well as to prevent separation of the perforated web at said first station. Associated with the second station are means responsive to such perforated web for initiating a time interval for movement of the film to the proper position for separating and severing, and means correlating the operations of said separating and severing means so that each bag is separated from the web at the perforated zone adjacent the seal before waste is severed from the web by said web severing means.

In the drawings:
FIG. 1 is a fragmentary plan view of flattened tubing in a typical operational sequence used to make pouches for stretch-packaging according to the invention;

FIG. 2 is a perspective view of a typical package;

Figure 3:
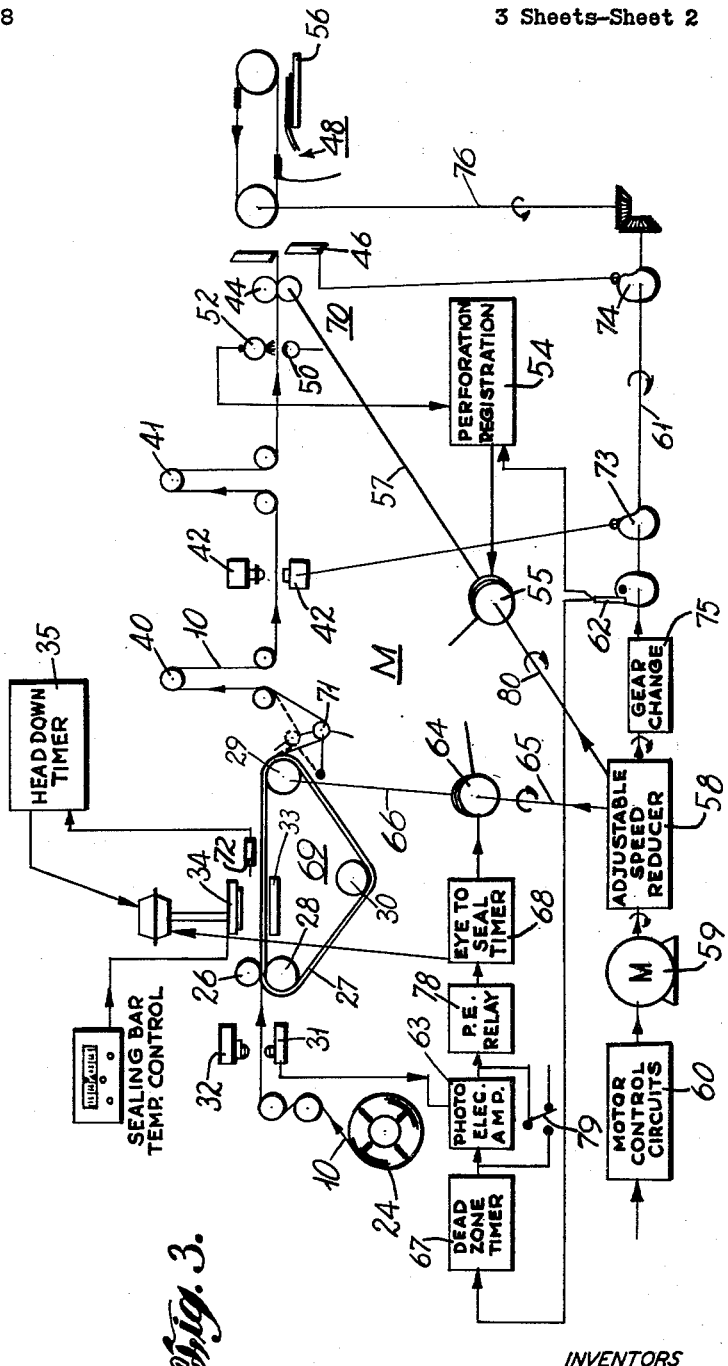
FIG. 3 is a schematic view in side elevation of an automatic machine illustrating the invention.

As shown in FIG. 1, web 10 is provided with printed registration marks 12 to determine the relative position of heat-seal 14 and imprinted design 16. The heat-sealing cycle is initiated by an optical indexing system, when the film is at rest. Time, temperature and pressure of the heat-seal cycle are closely controlled. Curved end bags may not be cut from the web simultaneously with the heat-sealing operation for the following reasons: (1) The heat-seal and cutoff should be positioned very close to each other, such as from 1/32″ to 1/8″ apart. Consequently, no practical curved cutoff knife can be arranged to cooperate in a single operation without the knife heating up and fuzing shut that end of the bag which must later be opened. (2) To obtain a heat-seal of required strength, it is necessary for the film to have a sealing time such as from 0.3 to 1.0 second, and a cooling time of approximately the same time interval, in a relaxed condition. This cooling time is gained during the transport cycle. (3) The "tail" of material between the curved heat-seal and the required straight cut must be removed and discarded. It has been found in practice that a curved open end bag is weak at the middle of the curve and breaks when distended on the stretching fingers of the bag-filling device. (4) For some meat products, ventilating holes must be punched in the bag, which is best done at a station subsequent to sealing. (5) The limp, relaxed web must be pulled rather than pushed through successive operations to a stacking device.

Consequently, the cutoff operation is displaced from the sealing operation by many bag lengths or units of imprinted design, such as from three to twelve lengths. An additional registration of the web is required near the cutoff position, in using the stretchy film necessary for the end product. When using unprinted film, no length reference except the seal is available, thus making an optical registration system impractical at the cutoff station.

Our method of separating the web into unit items comprises cutting a line of perforations 18 into the web parallel and in close proximity to the heat-seal 14. This permits intermittently pulling the perforated web in continuous form through the sequence of operations to the severing, cutoff and stacking position. The curved line of perforations also provides a practical reference point to index and control the subsequent severing and cutoff operations at 19 and 20 to produce each finished bag 21 and tail 22.

A typical package 23, utilizing such bag, is shown in FIG. 2.

As shown in FIG. 3, a reel 24 of flattened tubular film 10 is intermittently drawn into the machine M by a draw roll 26 cooperating with a belt 27 composed of fairly soft rubber that runs on a plurality of pulleys 28, 29 and 30. A photoelectric eye 31 disposed under web 10 in line with a light 32 above such web is used to register marks 12 printed on the web, when running imprinted film as shown. When using unprinted webs, an appropriate length is drawn into the machine by a suitable timing system.

Figure 5:
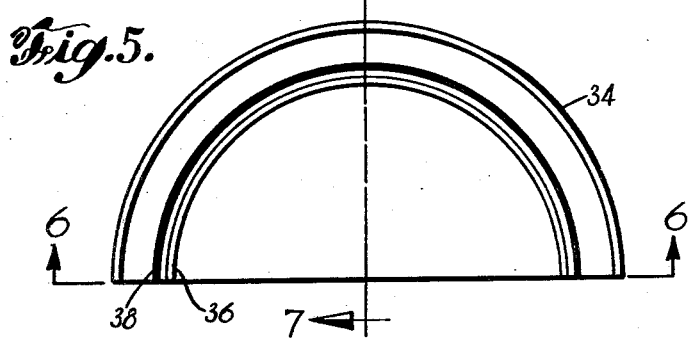
FIG. 5 is a fragmentary bottom view of the sealing and perforating device.
Figure 7:
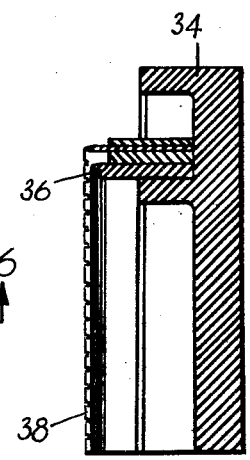
FIG. 7 is an enlarged cross-sectional detail taken on line 7—7 thereof.
Figure 6:
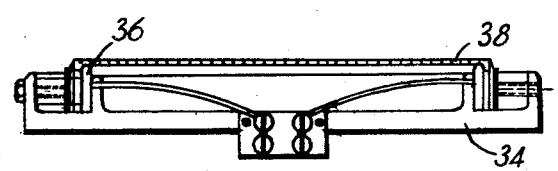
FIG. 6 is a view in cross section taken on line 6—6 of FIG. 5.

A combined sealing and perforating head 34 is positioned immediately downstream of draw roll 26 above the belt 27. Head 34 is actuated by a head-down timer 35 in a controlled time, pressure and heat cycle when the intermittently moving web 10 has come to rest. As shown in FIGS. 5–7, such head 34 is provided with a curved electrically energized heat-sealing element 36 and perforating knife 38 cooperating with the cushion-belt 27 and belt back-up plate 33 to form the bottom seal 14 of each pouch. The perforating knife is positioned immediately adjacent the heat-sealing element and is designed to cut a line of alternate short length cuts, such as 7/32″ long cuts on 1/4″ spacing, through the normally imperforate web, thus providing means for transporting the web in continuous form through subsequent operations of the machine.

As shown in FIG. 3, two adjustable web reservoirs 40 and 41 are located on either side of a hole punch unit 42. Such web reservoirs provide means for adjusting the length of web in process between sealing and punching and cutoff stations such that a plurality of pouch lengths lie therebetween. Downstream of the web reservoir 41 is an arrangement of intermittently operating draw rolls 44 cooperating with a web cutoff knife 46, and a gripper-bar stacker mechanism 48 to sever the web into unit pouches by pulling the web apart at the perforation line. Cutoff knife 46 then cuts off the tail which is discarded.

Since there may be from three to twelve pouch lengths between the sealing head and the severing arrangement, a sensing device is provided which synchronizes and times the action of draw rolls 44 with the severing and cutoff operations indexed by an appropriate reference point on the web. Such sensing device includes an electrode assembly comprising a lower, smooth, rounded electrode 50 which is electrically charged with about 4000 volts D.C., continuously energized from a suitable power source. An upper receiving electrode 52, which may be a metal brush, is positioned in close proximity and opposite the lower electrode, up to approximately 1/8″ therefrom, for example.

The web of film to be sensed and registered is transversely positioned midway between such electrodes, and normally insulates the high-voltage electrode discharge from the pickup secondary electrode. However, when a perforation in the web passes between the electrodes, a spark discharge occurs which triggers an impulse that, in turn, operates a relay through an appropriate time delay circuit 54. Such relay energizes a control mechanism to an electric clutch and brake arrangement 55 connecting shafts 80 and 57 comprising the driving mechanism of draw rolls 44 which intermittently move the film web 10. Shaft 80 is driven by an adjustable speed reducer 58. The time delay circuit 54 is adjustable, thus causing stoppage of each line of perforations 18 at a position appropriate for separating the web into unit items 21. As the web is stopped by the draw rolls 44, a moving gripper assembly of a stacker mechanism 48 engages and grips the pouch 21 attached to the web, extending, stretching, and tearing it at the perforations to free the pouch, and carries it to and deposits it on a delivery conveyor 56. Immediately thereafter, the knife 46 is actuated automatically to cut off the tail 22. The adjustable speed reducer is operated by a motor 59 that is provided with motor control circuits 60 which are connected to a suitable source of electric power. The speed reducer 58 also drives a cam shaft 61. The electromechanical cycle, which produces a bag, may be considered as beginning with the operation of a rotary reset switch 62 on shaft 61. This switch operates once for each bag produced. As the diagram shows, it is actuated mechanically from the "one revolution per bag" shaft 61. This mechanism also operates hole punch mechanism 42, cutoff knife 46, and the stacker device 48. Reset switch 62 simultaneously activates two registration circuits, namely, a photoelectric print register combination circuit comprised successively of 67, 63, 78, 68; and the perforation registration circuit 54.

The sequence of operation of the photoelectric print register circuit is as follows: closure of the reset switch 62 starts the film moving by releasing the brakes and engaging both clutches 55 and 64, thereby driving the knife draw rolls 44 and belt 27; the latter being connected to roll 29 which is driven by the adjustable speed reducer through shaft 65, clutch 64 and shaft 66.

Simultaneously "dead zone" timer 67 starts timing. The function of such timer is to keep the photoelectric registration pickup 31 inoperative ("dead") until a printed pattern of the web 10 has passed the light beam, but to reactivate it before a register bar 12 printed on the web, reaches the light beam. The operator sets this time according to the length of the printed pattern 16 to be blocked out. When the "dead zone" timer 67 "times out," the photoelectric pickup 31 becomes ready to detect the next registration bar 12. Interruption of the light beam by such registration bar results in starting an "eye to seal" timer 68. The "eye" is upstream of the sealing station. Timer 68 is set by the machine operator to permit the area of the film to be sealed, to advance to and stop at the sealing and perforating station 69. When timer 68 "times out," it simultaneously stops the web transport belt 27 by switching clutch 64 to brake, and initiates the sealing and perforating action of head 34.

The perforation registration circuit 54 is reset by switch 62 which caused the above sequence of events. At the instant the reset switch starts the film moving, the perforation detector 50—52 becomes ready to "sense" the next perforation in the film. When a perforation passes between the detector elements, a spark passes through the perforation. Through circuit 54, this results in an adjustable time-delayed operation of the brake-clutch assembly 55, to stop the film with the section 21 to be severed, located at station 70 containing the knife 46. The rate of feed of draw rolls 44 at station 70 is greater than that of draw mechanism 26—29 at station 69, such that draw rolls 44 normally stop a fraction of a second before draw mechanism 26—29. This difference in film feed rate is compensated for by a dancer roll 71. This permits running the web with a minimum of film tension in the machine M while maintaining registration at two separate locations 69 and 70 on the stretchable film.

Immediately after the film is stopped at both registration points at station 69 and 70, the sealing and perforating head 34 contacts the film on belt 27. It also actuates a switch 72, and starts "head-down" timer 35. Timer 35 is adjustable to vary the dwell time for various heat-seal requirements. When the sealing cycle is terminated, head 34 raises and the timer circuits are idle until reset switch 62 again operates to repeat the cycle for the next bag.

Cams 73 and 74 on shaft 61 are set so that the hole punch 42 and knife 46 are actuated while the film is stopped.

The stacker mechanism 48 is mechanically timed through gear change arrangement 75 driving shaft 61 and, in turn, driving shaft 76 to separate the film at the perforations and pick up the separated bag and deliver it to the conveyor 56.

To use the machine M on unprinted film, a switch 77 is turned to the unprinted position. This inactivates the photoelectric pickup 63 and determines the length of the bag as a function of film transport speed and total time elapsed, as set on consecutive timers 67 and 68; the latter being operatively associated with the former through a photoelectric relay 78.

Suitable interlocking circuity is employed: (1) To insure that the machine completes a cycle once started, even though the stop button is operated during the cycle; (2) To automatically stop the machine at the end of a cycle in the event of any malfunction, such as bad print, misregistration, runout of parent film roll, unintentional separation of web at perforation, jam up of film at knife; and (3) To protect the operator against injury, should a guard be lifted while the machine is in operation.

Figure 4:
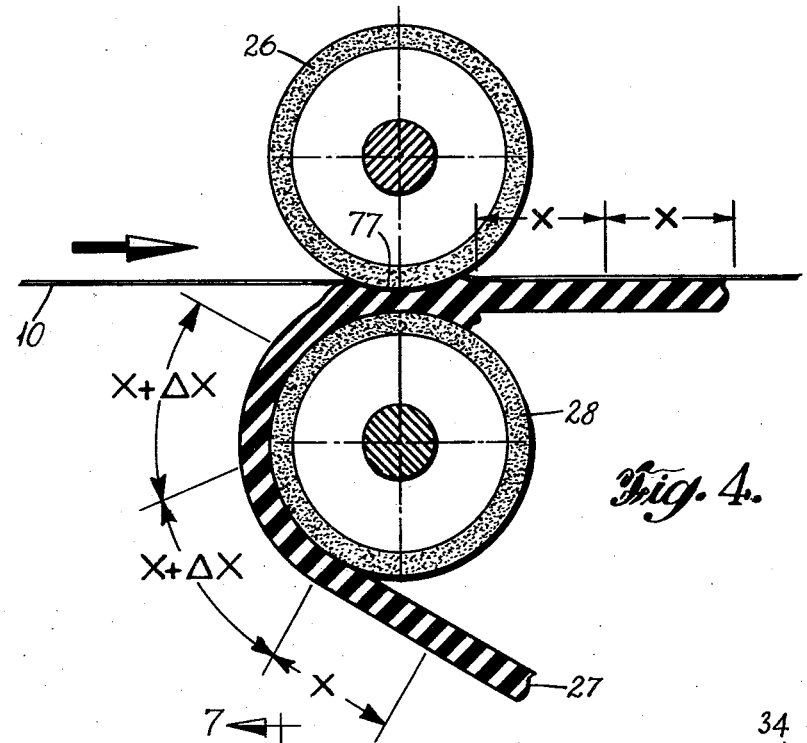
FIG. 4 is an enlarged fragmentary view in side elevation of the relaxing means.

Successful operation of sealing and perforating stretchable operation of sealing and perforating stretchable plastic film which, because of its elastic memory will shrink when tension is reduced, is dependent on presenting it to the sealing and perforating station 69 in a relaxed condition. The apparatus of the invention accomplishes this by feeding a greater length of film 10 into the machine than is taken out, thereby compensating for such shrinkage of the film. As shown in FIG. 4, the seal cushion belt 27 preferably consists of relatively thick resilient material. Such belt passes around supporting rolls 28—30, and is compressed at a nip point 77 by cooperating draw roll 26. The film 10 is fed on to the arcuate surface of the resilient belt 27 and thence to such nip point. The arcuate outer surface of the thick cushion belt has a greater radius than the supporting roll, thus the curved surface of the belt operates at a greater surface speed than the straight surface of the belt (between supporting rolls), thereby over-feeding the film on to the straight portion of the cushion belt.

The film enters the nip point 77 under tension, where it is tightly gripped, thus feeding the film through the nip on to the belt at the rate of travel of the belt surface in the contact area. The outer surface of the cushion belt in its curved length moves faster than the belt in its straight section, by a factor of $\Delta X$, i.e., a length X on the straight portion of the belt increases by $\Delta X$ on the curved outer surface. This difference in surface speed of the belt results in the film being delivered to the straight portion of the belt at a higher speed than that of the belt surface, thereby yielding a relaxed film of a length to compensate for shrinkage. This overcomes a very serious difficulty previously experienced, in attempts to automatically handle stretchy plastic film.

It can be readily seen that although the method and apparatus as described uses intermittent motion, the process is equally adaptable to a continuous method by appropriate adaptation by those skilled in the art.

The invention involves the following features: (1) In order to achieve the necessary strength to the curved heat-seal, head 34 presses the web 10 against a flat, resilient cooperating surface such as the continuous rubber belt 27 of 35°–45° durometer (Shore) when the film is relaxed and under no tension. (2) In order to transport the film through the operations and provide a means of secondary registration and means of severing the film close to the seal, a line of perforations is cut in the film at the same time the seal is made. A heated perforating knife is used to cut through the film against the soft rubber belt. (3) Registration of the heat-seal in close proximity to the position of severing the pouch and cutting off the waste by a signal responsive to marks on the film itself, the voids in the film, compensates for stretchiness of the web in transporting it the distance of three to twelve pouch lengths from the position of sealing and perforating. (4) An electric spark discharged through the line of perforations or openings in the film web, initiates the pulse or signal which registers the web position and the severing action. This action is highly selective because of the insulating effect of the imperforate web as contrasted to the minute voids of the line of perforations.

What is claimed is:

1. Process of making articles out of flattened tubing such as a continuous web of stretchy film, which comprises feeding such flattened tubing to a first station; relaxing a portion of the length of such flattened tubing at said station; sealing such relaxed portion of said flattened tubing to provide the bottom closure of each article at said station; simultaneously perforating such relaxed portion of said flattened tubing adjacent such seal outside of the bottom closure to provide a weakened transverse structure for subsequently separating adjacent parts of such web and also to provide an opening for an electrical discharge between electrodes located at a second station; discharging an electric current through such opening at said second station; in response to such electric current, pulling each article of said flattened tubing away from the rest of said continuous web to separate such article along such weakened structure; and additionally severing said web along a line extending transversely across said web to remove waste left between the edge of the end of said film and the unsealed top of the next article portion of said web.

2. Process as defined by claim 1, in which such web is provided with printed registration marks defining the overall length of each bag including said waste, initiating a time interval in response to each registration mark, and at the end of such time interval stopping the web feed at such first station in proper position for such simultaneous sealing and perforating operations.

3. Process as defined by claim 2, in which such web stoppage is controlled so that the sealing and perforating operations occur adjacent the registration mark that initiates such time interval, thus eliminating error from undesirable cumulative effect of such stretchy film over an extended length of such web.

4. Process of making bags out of flattened seamless tubing such as continuous web of stretchy thermoplastic film which comprises feeding and simultaneously relaxing a portion of the length of such flattened tubing at a first station; sealing said flattened tubing to provide the bottom closure of each bag at said station; perforating said flattened tubing adjacent such seal outside the bottom closure to provide a weakened transverse structural line for separating adjacent parts of such web; pulling each bag portion of said flattened tubing away from the supply portion of said continuous web at a second station to separate such bag portion at such weakened structural line; and severing said web along a line extending transversely across said web to remove waste left between the edge of the end of said film and the unsealed top of the next bag portion of said web.

5. Process of making bags out of flattened tubing such as continuous web of stretchy thermoplastic film which comprises delivering such flattened tubing to a first station; relaxing by overfeeding a portion of the length of such flattened tubing at said station; sealing said flattened tubing to provide the bottom closure of each bag at said station; perforating said flattened tubing adjacent such seal outside of the bottom closure to provide a weakened transverse structural line for separating adjacent parts of such web; and pulling each bag portion of said flattened tubing away from the supply portion of said continuous web at a second station to separate such bag portion at such weakened structural line.

6. Process of making bags out of flattened tubing such as continuous web of film which comprises feeding such flattened tubing to a first station; sealing said flattened tubing to provide the bottom closure of each bag to be made at said station; simultaneously perforating said flattened tubing adjacent such seal outside of the bottom closure to provide a weakened transverse structural line for separating adjacent parts of such web and also to provide an opening for an electrical discharge between electrodes located at a second station; discharging an electric current through said opening at said second station; in response to such electric current, pulling each bag portion of said flattened tubing away from the supply portion of said continuous web to separate such bag portion at such weakened structural line; and severing said web along a line extending transversely across said web to remove the waste left between the edge of the end of said film and the unsealed top of the next bag portion of said web.

7. Process of making bags out of flattened tubing such as continuous web of film which comprises feeding such flattened tubing to a first station; sealing said flattened tubing to provide the bottom closure of each bag at said station; perforating said flattened tubing adjacent such seal outside of the bottom closure to provide a weakened transverse line for separating adjacent parts of such web and also to provide an opening for an electrical discharge between electrodes located at a second station; discharging an electric current through said opening at said second station; in response to such electric current, pulling each bag portion of said flattened tubing away from the supply portion of said continuous web to separate such bag portion at such weakened structural line; and severing said web along a line extending transversely across said web to remove waste left between the edge of the end of said film and the unsealed top of the next bag portion of said web.

8. Process of making bags out of flattened tubing such as continuous web of film which comprises feeding such flattened tubing in a relaxed condition to a first station; sealing said flattened relaxed tubing to provide the bottom closure of each bag at said station; perforating said flattened relaxed tubing adjacent such seal outside of the bottom closure to provide a weakened transverse line for subsequently separating adjacent parts of such web at a second station and also to provide a registration mark; in response to such mark stopping the web and pulling each bag portion of said flattened tubing away from the rest of said continuous web to separate such bag portion at such weakened line; and severing said web along a line extending transversely across said web to remove waste left between the edge of the end of said film and the unsealed top of the next bag portion of said web.

9. Process of making bags out of flattened continuous film tubing which comprises overfeeding such flattened tubing to a first station; sealing said flattened overfed tubing to provide the bottom closure of each bag at said station; perforating said flattened tubing adjacent such seal outside of the bottom closure to provide a weakened transverse line for subsequently separating adjacent parts of such web at a second station and also to provide a registration mark and, in response to such mark, pulling each bag portion of said flattened tubing away from the supply portion of said continuous web to separate such bag portion at such weakened line.

10. An automatic article-making machine comprising, in combination, first and second stations provided with means for sealing and perforating a continuous web of stretchable film in the form of flattened tubing at said first station, and means for separating articles and cutting waste from such web at said second station, means for feeding said film to said first station overfeeding means associated with said feeding means for delivering said film to said first station in a relaxed condition, so that maximum strength seals are provided in the web as well as to prevent separation of the perforated web at said first station, means for conveying said sealed and perforated web from said first station to said second station, means responsive to such perforated web at said second station for initiating a time interval for movement of the film to the proper position for separating and serving, and means correlating the operations of said separating and cutting means so that each article is separated from the web at the perforated zone adjacent the seal before waste is severed from the web by said web severing means.

11. An automatic article-making machine as defined by claim 10, in which said first station is provided with electric circuit means including a photoelectric cell for sensing a registration mark on said web corresponding to the overall length of each article and waste, means associated with said photoelectric cell circuit for rendering such circuit inoperative except in the zone of such marks, comprising a time-delay circuit associated with said cell, and means operated by said time-delay circuit for stopping the movement of said web at said first station in proper position with respect to said sealing and perforating means.

12. An automatic machine comprising, in combination, means for simultaneously heating and perforating a continuous web of stretchable film, means for separating parts and severing waste from such web, overfeeding means for delivering said film in a relaxed condition to prevent separation of the perforated web during such perforating operation, means for conveying said heated and perforated web, means responsive to such perforated web for initiating a time interval for movement of the film to the proper position of separating and severing, and means correlating the operations of said separating and severing means so that each part is separated from the web at the perforated zone before waste is severed from the web by said web severing means.

13. An automatic machine comprising, in combination, first and second stations provided with means for heat-sealing and perforating a continuous web of stretchable thermoplastic film at said first station, and means for separating the so-sealed part and cutting waste from such web at said second station, means for feeding said film to said first station, overfeeding means associated with said feeding means for delivering said film to said first station in a relaxed condition so that maximum strength seals are provided in the web as well as to prevent separation of the perforated web at said first station, means for conveying said sealed and perforated web from said first station to said second station, means responsive to such perforated web at said second station for initiating a time interval for movement of the film to the proper position for separation and severance, and means correlating the operations of said separating and severing means so that each sealed part is separated from the web at the perforated zone adjacent the seal before waste is severed from the web by said web severing means.

14. An automatic machine comprising, in combination, a station provided with means for heat-sealing and perforating a continuous web of stretchable film at said station, overfeeding means for feeding said film to said station, means associated with said feeding means for delivering said film to said station in a relaxed condition so that maximum strength seals are provided in the web as well as to prevent separation of the perforated web at said first station, and means for conveying said sealed and perforated web from said station.

15. An automatic machine comprising, in combination, a station provided with means for perforating a continuous web of stretchable film, means for feeding said film to said first station, overfeeding means associated with said feeding means for delivering said film to said station in a relaxed condition to prevent separation of the perforated web at said station, means for conveying said perforated web to another station, means responsive to such perforated web at said second station for initiating a time interval for movement of the film to the proper position for separation, and means for separating said perforated web in such position.

16. In an automatic bag-making machine, the combination with a supporting cushion in the form of a belt for delivering a stretchy plastic film to a heat-sealing and perforating station, a combined heat-sealing and perforating head arranged above the film on said belt, means including said belt and a roll which nips said film below the normal surface of said belt for feeding to and supporting said film in a relaxed condition on said belt under said head when the belt stops, and means for pressing the so-relaxed film between said head and cushion to simultaneously heat-seal and perforate it.

References Cited in the file of this patent

UNITED STATES PATENTS

| | | |
|---|---|---|
| 1,174,069 | Hosford | Mar. 7, 1916 |
| 2,191,497 | Potdevin | Feb. 27, 1940 |
| 2,200,971 | Sonneborn | May 14, 1940 |
| 2,326,931 | Dalton | Aug. 17, 1943 |
| 2,760,290 | Miller | Aug. 28, 1956 |
| 2,800,163 | Rusch | July 23, 1957 |

FOREIGN PATENTS

| | | |
|---|---|---|
| 213,105 | Australia | Feb. 12, 1958 |